US010953559B2

(12) United States Patent
Kim (10) Patent No.: US 10,953,559 B2
(45) Date of Patent: Mar. 23, 2021

(54) FOOD CUTTING APPARATUS (71) Applicant: Seok Kim, Carrollton, GA (US)

(72) Inventor: Seok Kim, Carrollton, GA (US)

(*) Notice: Subject to any disclaimer, the term of this patent is extended or adjusted under 35 U.S.C. 154(b) by 125 days.

(21) Appl. No.: 16/176,129

(22) Filed: Oct. 31, 2018

(65) Prior Publication Data
US 2020/0130213 A1 Apr. 30, 2020

(51) Int. Cl.
*B26B 29/06* (2006.01)
*A47J 47/00* (2006.01)
*B26B 1/00* (2006.01)
*B26B 3/04* (2006.01)
*B26B 3/00* (2006.01)

(52) U.S. Cl.
CPC ............ *B26B 29/063* (2013.01); *A47J 47/005* (2013.01); *B26B 1/00* (2013.01); *B26B 3/00* (2013.01); *B26B 3/04* (2013.01)

(58) Field of Classification Search
CPC ... B26B 29/063; B26B 3/00; B26B 2029/066; A47J 47/005
USPC ........ 33/1 F; 426/518; 269/295; 83/762, 763
See application file for complete search history.

(56) References Cited

U.S. PATENT DOCUMENTS

| | | | | |
|---|---|---|---|---|
| 850,973 A | * | 4/1907 | Pringle ................... | A63G 27/00 104/77 |
| 1,072,450 A | * | 9/1913 | Hamblin ............... | B26B 29/063 83/762 |
| 1,131,333 A | * | 3/1915 | Coon .................... | B26B 29/063 83/762 |
| 1,703,154 A | * | 2/1929 | Lanzkron .............. | B26B 29/063 83/762 |
| 1,764,235 A | * | 6/1930 | Wilmking ............. | B26B 29/063 83/762 |
| 1,867,993 A | * | 7/1932 | Tuttle ................... | B26B 29/063 83/762 |
| 2,398,192 A | * | 4/1946 | Scheminger, Jr. .... | B26B 29/063 83/762 |

(Continued)

FOREIGN PATENT DOCUMENTS

FR 2750356 A1 * 1/1998 ........... B26B 29/063

*Primary Examiner* — Christopher W Fulton
(74) *Attorney, Agent, or Firm* — Park & Associates IP Law, P.C.

(57) ABSTRACT

A food cutting apparatus includes first and second guide panels spaced apart from each other at a preset distance, the first and second guide panels each having a plurality of cutting slots formed downwardly at regular interval, defining a plurality of cutting guide paths to guide a cutting knife there-through to cut food products placed between the guide panels into pieces; a cutting board placed between the first and second guide panels, the cutting board having a predetermined width configured to preset the distance of the first and second guide panels by abutting the first and second guide panels against two opposing side faces of the cutting board placed there-between, thereby, enabling the user to slice the placed food products into multiple pieces using a cutting knife introduced to the plural pairs of corresponding cutting slots of the first and second guide panels; and first and second guide posts coupled perpendicularly to the first and second guide so as to guide and position the first and second guide panels at the preset distance there-between. Multiple cutting boards of different widths can be provided to place and cut different amount or rolls of the food products.

15 Claims, 8 Drawing Sheets

(56) References Cited

U.S. PATENT DOCUMENTS

| | | | | |
|---|---|---|---|---|
| 4,125,046 | A * | 11/1978 | Kroh | B26B 29/063 269/288 |
| 4,890,525 | A * | 1/1990 | Bilbao | B26B 29/06 30/124 |
| 5,287,784 | A * | 2/1994 | Brockett | A47J 47/00 83/746 |
| 5,499,578 | A * | 3/1996 | Payne | A47J 43/18 30/114 |
| 5,697,276 | A * | 12/1997 | Nassau | B26B 29/063 269/291 |
| 8,191,453 | B2 * | 6/2012 | Ichihara | G01N 1/06 83/466.1 |
| 8,272,631 | B2 * | 9/2012 | Gannon | B26D 7/01 269/90 |
| 9,266,247 | B1 * | 2/2016 | Coulon | B26B 29/063 |
| 9,636,831 | B1 * | 5/2017 | Furia | B26D 3/16 |
| 2010/0050838 | A1 * | 3/2010 | Noguchi | G01N 1/36 83/39 |
| 2011/0232441 | A1 * | 9/2011 | Aguirre | A47J 47/005 83/35 |
| 2012/0297991 | A1 * | 11/2012 | Hueser | B26F 1/24 99/547 |
| 2014/0054836 | A1 * | 2/2014 | Chen | A47J 9/00 269/288 |
| 2014/0179209 | A1 * | 6/2014 | Weng | A22C 17/002 452/194 |
| 2015/0217470 | A1 * | 8/2015 | Lowetz | B26B 29/063 83/39 |
| 2015/0300819 | A1 * | 10/2015 | Pelletier | G01C 9/34 33/379 |
| 2017/0217036 | A1 * | 8/2017 | Turover | B26B 29/063 |
| 2018/0296042 | A1 * | 10/2018 | Beltramo, Jr. | A47J 47/005 |
| 2020/0171690 | A1 * | 6/2020 | West | B26B 29/063 |

* cited by examiner

FOOD CUTTING APPARATUS

FIELD OF THE INVENTION

The present invention relates to a food cutting apparatus used to hold and neatly cut food products (for example, such as gimbap rolls and sushi rolls, and similar products) into pieces of desired length without having the fears of cutting the user's fingers or otherwise damaging the shapes of the sliced food during the cutting processes.

BACKGROUND OF THE INVENTION

Rolled food products (e.g., sushi rolls and gimbap rolls) are cut or sliced into pieces by the preparers using a knife before serving the foods. However, the tasks of cutting/slicing such rolled food products present risks to the food preparers as the preparers can accidentally cut or injure their fingers during the process of cutting the rolls into pieces of desired sizes. In addition, the rolled sushi or gimbap is easy to be burst open during the cutting/slicing process as they are made of soft food (such as cooked rice and other food ingredients) which is wrapped with fragile edible skins, such as thin layer seaweed, that is easy to break or burst open during the cutting processes with knife.

SUMMARY OF THE INVENTION

Accordingly, the present invention has been made to solve the above-mentioned and other problems occurring in the prior art. Thus, it is an object of the present invention to provide a food cutting apparatus used to slice gimbap and sushi rolls, and other similar food products of elongated shape (e.g., bread sticks, ham, elongate sausage and cheese products), into pieces of desired length conveniently and in a safe manner, without the fears to cut the cooker's fingers and deteriorating/damaging the shapes of the sliced food during the cutting processes.

To accomplish the afore-mentioned and other objects, the food cutting apparatus of the present invention includes a plurality of vertical guide panels which are positioned to space apart from each other at certain distance, in which the distance is preferably adjustable by the users, and a plurality of cutting slots formed in the vertical guide panels at regular interval in order to safely guide the cutting knife of the user there-through in order to cut the rolled food products placed between the guide panels into pieces of desired serving sizes.

The food cutting apparatus further includes a plurality of guide shaft to guide and set the distance between the adjacent guide panels at selected distance. The food cutting apparatus further includes one or more designated cutting boards to be placed between the vertical guide panels, the cutting boards having predetermined widths designed to preset the distance of the adjacent guide panels by pulling and abutting the adjacent guide panels against the opposed side faces of the selected cutting board placed therein, thereby, enabling the user to slice the food into suitable sizes using a knife introduced to the cutting slots of the vertical guide panels. Multiple cutting boards of different widths can be provided to place and cut different amount or rolls of the food products.

The food cutting apparatus preferably further includes a metal liner layering around the exposed surfaces of the cutting slots of the guide panels, which can prevent the cutting slots from tearing and wearing upon extended usage of the device, thus, extending the life of the cutting apparatus, and also enhancing healthy and sanitary serving of the foods.

According to one aspect of the present invention, the food cutting apparatus includes:

first and second guide panels positioned to stand vertically and spaced apart from each other at a preset distance, each of the first and second guide panels having a plurality of cutting slots formed downwardly at regular interval, with each pair of corresponding cutting slots of the first and second guide panels defining a cutting guide path to guide a cutting knife there-through to cut food products placed between the guide panels into pieces;

a cutting board placed between the first and second guide panels, the cutting board having a predetermined width configured to preset the spaced distance of the first and second guide panels corresponding to the predetermined width by abutting the first and second guide panels against two opposing side faces of the cutting board placed there-between, thereby, enabling the user to slice the placed food products into multiple pieces using a cutting knife introduced to the plural pairs of corresponding cutting slots of the first and second guide panels; and first and second guide posts coupled perpendicularly to the first and second guide panels so as to guide and position the first and second guide panels spaced at the preset distance there-between.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE INVENTION

Reference will be now made in detail to the preferred embodiment of the present invention with reference to the attached drawings.

The disclosed embodiments should not be construed as limited to the particular shapes of the parts illustrated herein but may include deviations in shapes that result, for example, from manufacturing. In the drawings, lengths, sizes, and regions may be exaggerated for clarity. Like reference numerals in the drawings are used to denote like elements.

Furthermore, unless defined otherwise, all the terms used in this specification including technical and scientific terms have the same or similar meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

Figure 1:
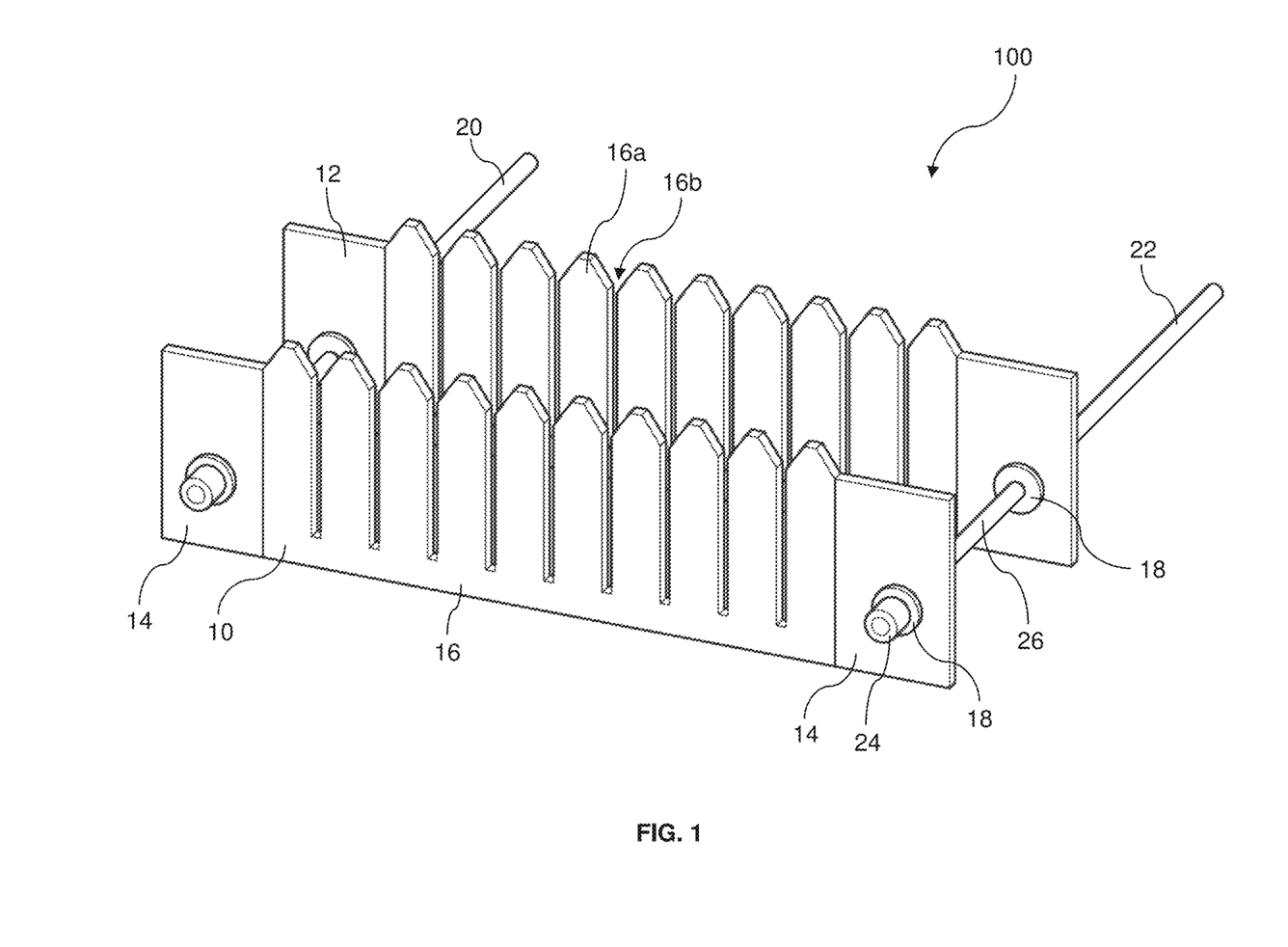
FIG. 1 is a perspective view of a food cutting apparatus according to one preferred embodiment of the present invention.
Figure 2:
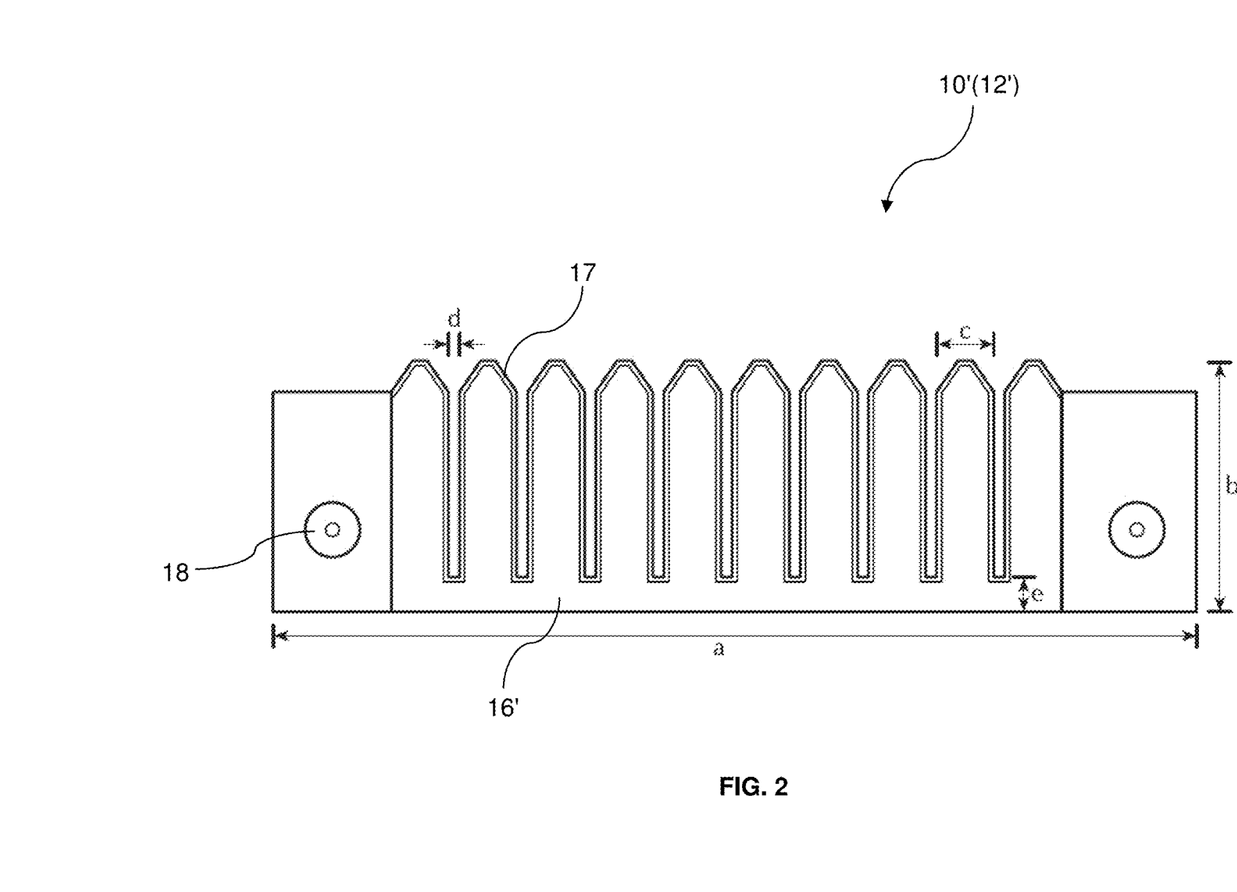
FIG. 2 is a front elevational view illustrating a vertical guide panel, according to one preferred embodiment of the present invention.

FIG. 1 is a perspective view of a food cutting apparatus according to one preferred embodiment of the present invention, and FIG. 2 is a front elevational view illustrating a vertical guide panel according to another preferred embodiment of the present invention.

As shown in FIG. 1, the food cutting apparatus 100 includes a plurality of (e.g., two) vertical guide panels (e.g., a first guide panel 10 and a second guide panel 12) spaced apart from one another at a selected distance, and a plurality of (e.g., two) guide posts 20 and 22 configured to guide the vertical guide panels 10 and 12 to position them at desired distance there-between.

Each of the guide panels 10 and 12 preferably includes a pair of lateral body portions 14 at opposite sides of the panel and an intermediate body portion 16 between the lateral body portions 14. The intermediate body portion 16 is configured to have protruded peak portions 16a of triangular, truncated-triangular, hemi-circular, or similar shape, and cutting slots 16b are formed to run vertically between adjacent protruded portions 16a to a distance to reach near the bottom side of the panel. The cutting slots 16b are for guiding cutting knives in order to safely cut the food (e.g., sushi or gimbap rolls) placed between the vertical guide panels 10 and 12. The cutting slots 16b have a slot width of about 1.5 mm to 3 mm, and a slot length of about 40 mm to 120 mm, however, the dimension of the cutting slots can be modified depending on the particular food to be cut and the particular types of knives to be used. The guide panels 10 and 12 are made of hard and durable materials, preferably of innocuous and non-rusting materials, for example, such as stainless steel, aluminum alloy, and innocuous polymer materials such as Polycarbonates (PC), Polypropylene (PP), Polyethylene (PE), and other harmless and durable plastic materials.

Each of the guide panels 10 and 12 preferably further includes guiding bushings 18 forcedly fit to corresponding circular holes formed at predetermined locations of the lateral body portions 14 to enable a precise guiding and spacing of the vertical guide panels 10 and 12. The guide bushings 18 are preferably made of hard and non-rusting materials, for example, such as stainless steel.

Figure 1A:
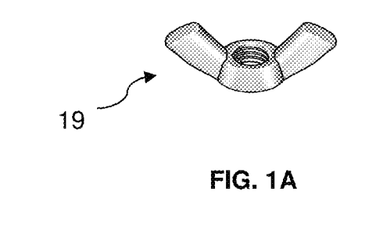
FIG. 1A is a perspective view of a wing nut as an example of a sliding movement locking element to securely position the vertical guide panels of the present invention.

Each of the guide posts 20 and 22 preferably includes enlarged head portion 24 at one terminal side, and shaft portion 26 extending linearly from the head portion, which is adapted to precisely guide the positioning of the vertical guide panels 10 and 12 with the aid of guide bushings 18 securely affixed to the panels. Here, the guide posts 20, 22, and the guide bushings 18 are preferably in snug fit and configured to maintain the selected distance of the two vertical guide panels 10 and 12 during the cutting process of the placed food unless the user applies a lateral force to enlarge the distance of the guide panels 10 and 12. This is helpful to the user to cut the food neatly and into constant slice. Alternatively, at least one sliding movement locking element, preferably of the quick mounting type known in the art (such as fly nut or wing nut 19 as shown in FIG. 1A), can be installed on the shaft 26 at a location on the backside of the second guide panel 12 in order to stop the backward sliding movement of the second guide panel 12 during the food cutting process which applies an expanding pressure to the guide panels due to the lateral expansion force of the food generated due to the cutting pressure. For this, the shaft 26 must be modified to have outer threads (not shown) at the outer circumference of the shaft at the rear side of the second guide panel 12 to allow the sliding movement locking element (e.g., wing nut 19) to couple to the shaft and block the sliding movement of the second guide panel 12. The movement blocking members can be any known elements or fasteners that can easily be moved along the shaft by the user and maintain its position once they are positioned unless the user purposefully moves its location.

FIG. 2 illustrates another example of the vertical guide panels of the foot cutting apparatus. As shown, the vertical guide panels 10' and 12' of this embodiment are similar to the vertical guide panels 10 and 12 of FIG. 1 explained above, however, includes some modification thereto as explained below. Common features and structure of this embodiment is not repeated here for simplicity purposes.

In this embodiment, the vertical guide panels 10' and 12' are preferably formed of polymer, plastic, or composite materials, such as Polycarbonates (PC), Polypropylene (PP), Polyethylene (PE), and other harmless and durable plastic or composite materials, and include a metal liner 17 covering around the exposed surfaces of the cutting slots 16b of the guide panels. The metal liner 17 is formed of harmless and innocuous metal, such as stainless steel and harmless metallic alloy, which can protect the slot areas of the food cutting guide panels, and thus, preventing the cutting slots from wearing, tearing, and chipping out by the use of knives made of superior strength and hardness. Thus, it extends the life of the cutting apparatus, and also promotes healthy and sanitary serving of the sliced foods.

The exemplary dimensions of the guide panels of the foot cutting apparatus are described in connection with this embodiment of FIG. 2 which is typically contemplated to be used for cutting sushi and gimbap rolls. However, the guide panels of the previous embodiment of FIG. 1 may have the same or similar dimensions, or different dimensions depending on the intended food to be cut.

The length ("a") of the guide panels 10/12 and 10'/12' is preferably in the range between 20 and 30 cm, and the height ("b") between 6 and 8 cm. The width ("c") of one panel section of the guide panels 10/12 (10'/12') is preferably in the range between 1.2 and 3.5 cm, and the width ("d") of the cutting slots between 0.15 and 0.3 cm. The thickness ("e") of the remaining material portion from the end of the slots to the bottom surface of the guide panels is preferably between 0.8 and 2 cm. It is noted that these dimensions (in particular, the length "a". the height "b", the section width "c") can be changed when the apparatus is adapted to cut or slice different foods other than sushi and gimbap rolls.

Figure 3:
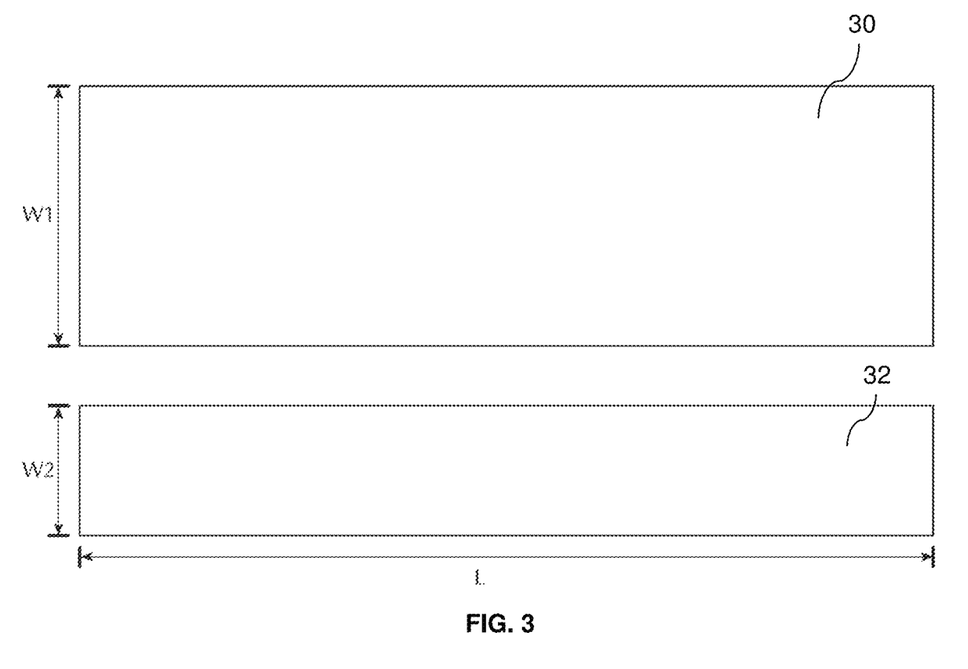
FIG. 3 is a schematic plan view illustrating an example of two cutting boards of different width that are configured to place between the vertical guide panels, according to the present invention.

FIG. 3 illustrates, in schematic plan view, an exemplary shape of cutting boards which can be placed between two opposing guide panels 10/12 and 10'/12', according to one preferred embodiment of the present invention.

The first cutting board 30 and the second cutting board 32 each has a generally rectangular plate shape similar to most common cutting boards available in the market. Various materials used for regular cutting boards available in the market can also be used for the materials of these cutting boards 30 and 32 of the present invention. For example, harmless polymer or plastic materials, wood or similar materials, and composite materials known in the cutting board manufacture can be used as long as they can suitably be served for the cutting board functions for food preparation.

Figure 5:
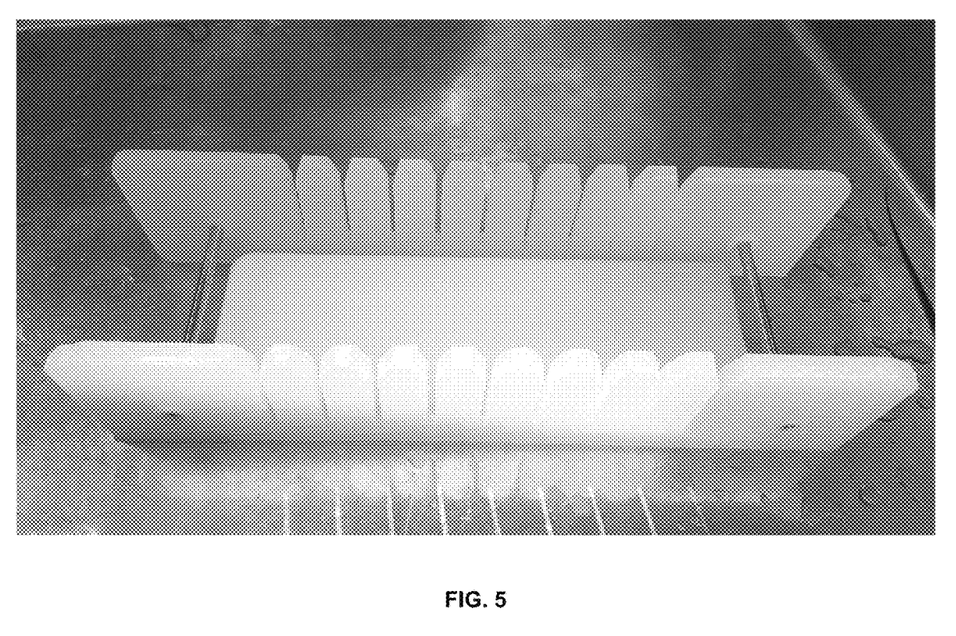
FIG. 5 is a photographic view illustrating the food cutting apparatus with a cutting board placed between two cutting guide panels, according to one embodiment of the present invention.

The first cutting board 30 and the second cutting board 32 may have the same length "L" that can cover the overall length of the intended food to cut, for example, such as sushi and gimbap rolls. However, the first cutting board 30 and the second cutting board 32 are configured to have different widths "W1" and "W2", in which the wider cutting board 30 is for cutting multiple (e.g., two) rolls/bodies of intended food (e.g., sushi and gimbap rolls) as shown in FIGS. 5 and 7 for example, and the narrower cutting board 32 is for a single roll/body of the intended food as shown in FIG. 6 for example.

Here, two cutting boards 30 and 32 having the same length and different widths are shown to describe the present apparatus of the invention. However, additional cutting boards of different sizes can be provided depending on the usage of the food cutting apparatus. For example, a third cutting board with the same length "L" and wider width can be provided to cut more rolls of sushi or gimbap rolls of the same size or to cut same number of rolls having bigger size.

Figure 6:
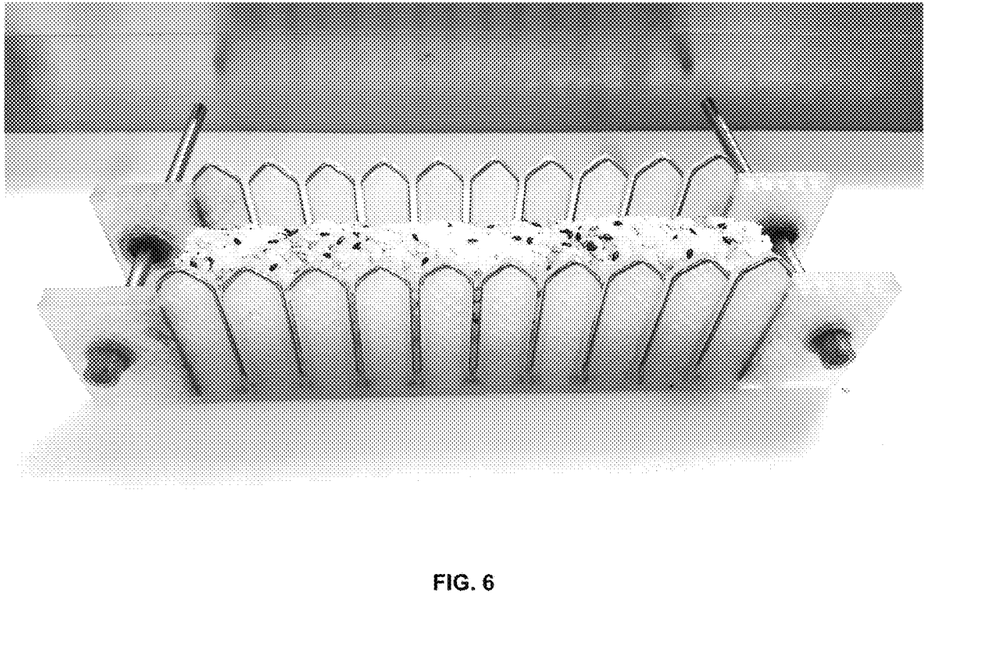
FIG. 6 is a photographic view illustrating the food cutting apparatus with one roll of intended food placed in the apparatus, according to one embodiment of the present invention.

FIG. 6 illustrates the food cutting apparatus of present invention with one of the cutting boards of narrower width (e.g., the second cutting board 32) placed between two cutting guide panels 10 and 12 (or 10' and 12'), and with one sushi roll positioned on the cutting board 32 to cut.

Figure 7:
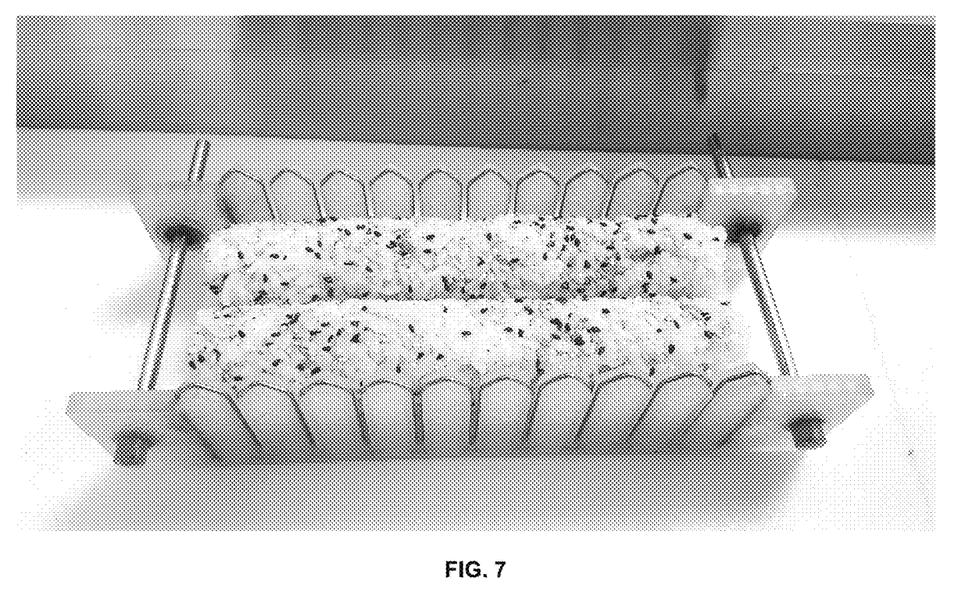
FIG. 7 is a photographic view illustrating the food cutting apparatus with two rolls of intended food placed in the apparatus of FIG. 6.

FIG. 7 illustrates the food cutting apparatus of present invention with one of the cutting boards of wider width (e.g., the first cutting board 30) placed between two cutting guide panels 10 and 12 (or 10' and 12'), and with two sushi rolls positioned on the cutting board 30 to cut. Similarly, the food cutting apparatus of present invention can conveniently be modified to receive more food rolls therein by changing the width of the cutting board to be placed.

Figure 4A:
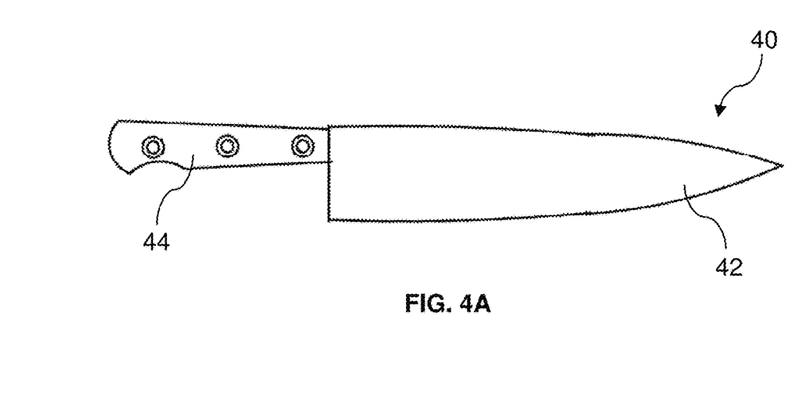
FIG. 4A and FIG. 4B are views illustrating the cutting knifes which can be used for the food cutting apparatus according to the present invention.
Figure 4B:
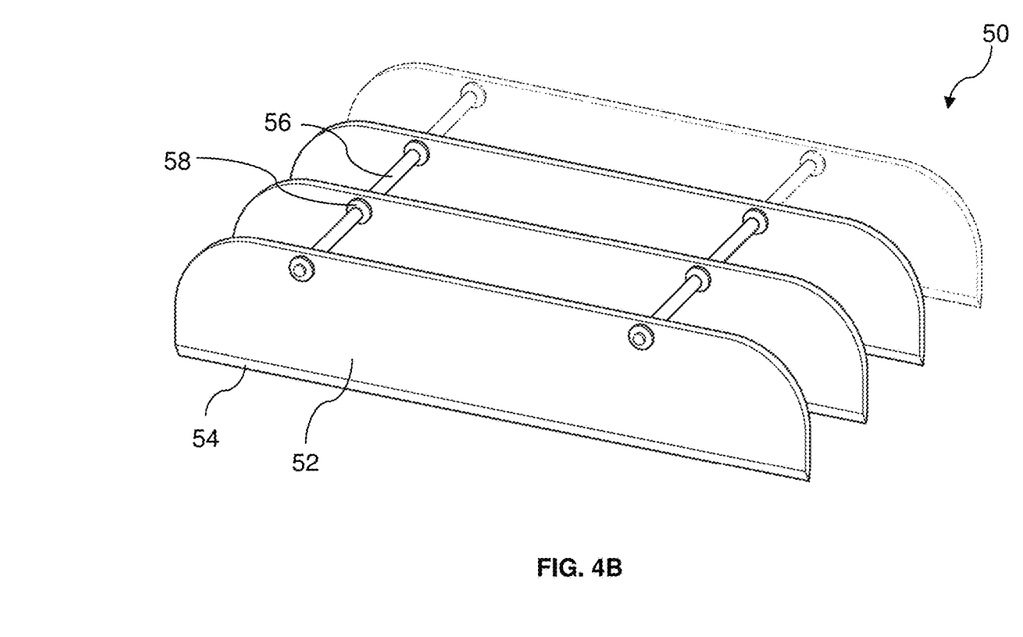

Referring now to FIGS. 4A and 4B, a cutting knife to be used with the food cutting apparatus of present invention is described herein. It is noted that various cutting knives can be used as long as they can suitably be served for the cutting functions for the intended food preparation.

As shown in FIG. 4A, a conventional food knife 40 with a knife blade 42 coupled to a handle 44, can be used for cutting the placed food into slices with the knife pressed downward through each and every cutting slots 16b of the guide panels 10/12 (or 10'/12') successively one slot after another.

Alternatively, as shown in FIG. 4B, a specialized cutting knife 50 can be used for cutting the placed food into multiple slices at a time, in a more efficient and fast way. The cutting knife 50 includes a plurality of cutting blades 52 arranged in a regular interval, that is, in the same interval as the cutting slots 16b of the guide panels 10/12 (or 10'/12'). The cutting blades have a sharp cutting edge 54 to cut the food placed in the apparatus, and the user can introduce the multiple blades through the corresponding cutting slots 16b of the guide panels 10/12 (or 10'/12') and apply a downward pressure to cut the placed food into multiple slices at a time.

As shown in FIG. 4B, a plurality of (e.g., two) guide shafts 56 are affixed to an upper side of the multiple cutting blades 52, while securely inserted through two through holes formed at two upper lateral sides of the cutting blades 52, and the interval of the cutting blades 52 is adjusted to have the same interval of the cutting slots 16b of the guide panels. In order to securely hold the cutting blades 52 in the intended fixed locations, the apparatus preferably includes fixation bushings 58 that are securely attached to the corresponding insertion holes of the cutting blades 52, and the guide shafts 56 are inserted through the fixation bushings 58, then the locations of the blades 52 are securely adjusted to stay at the intended fixed locations corresponding to the cutting slots 16b of the apparatus. The shafts 56 and the fixation bushings 58 are preferably made of hard and non-rusting materials, for example, such as stainless steel.

Here, the guide shafts 56 and the fixation bushings 18 are preferably in snug or forced fit to maintain the selected distance of the cutting blades. However, the apparatus can also be configured to make the cutting blades moveable to adjust the spacing in order to meet the configuration of different guide panels having different cutting slots intervals to enable to cut such food into different slice sizes. Moreover, in order to facilitate the proper spacing of the cutting blades 52, an annular spacer (not shown) having a predetermined length and with its inner hole diameter the same or slightly larger than the guide shafts 56, can be installed to the guide shafts 56 between each two adjacent blades 52. The length of the spacers is designed to meet the interval of the cutting slots 16b. With these spacers placed between the cutting blades 52, the user can conveniently fix the interval of the blades to correspond to the interval of the cutting slots 16b.

Figure 8:
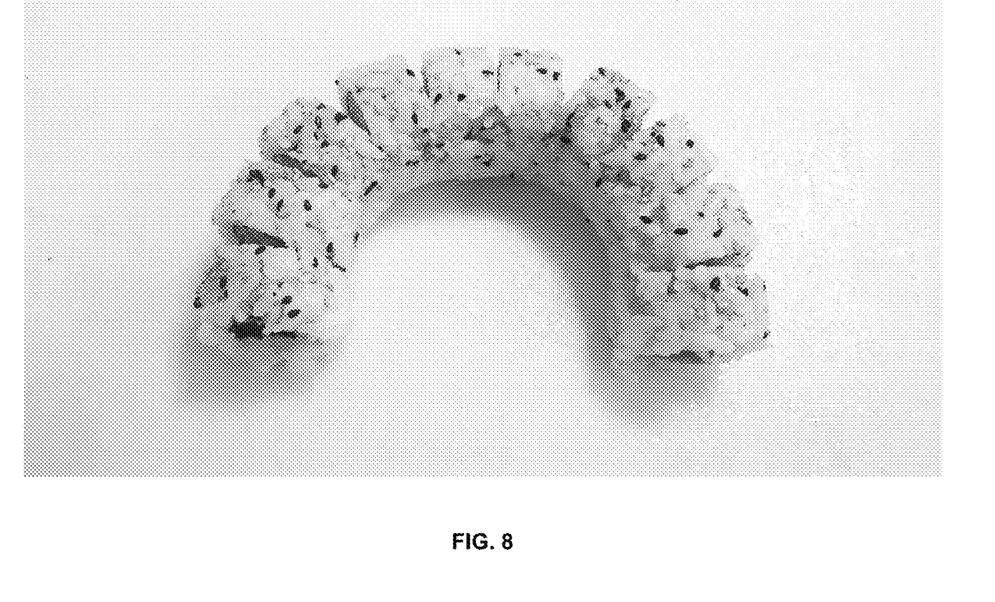
FIG. 8 is a photographic view illustrating an example of the sliced food using the cutting apparatus of the present invention.

FIG. 8 shows one example of a sushi roll cut into pieces for serving utilizing the food cutting apparatus of present invention, such as those shown in FIGS. 1, 5-7. As such, food products of elongated shape (e.g., gimbap and sushi rolls) can conveniently be cut into pieces of desired length in a safe and efficient manner, without the fears to cut the cooker's fingers and deteriorating/damaging the shapes of the sliced food during the cutting processes.

While the present invention has been described with reference to the particular illustrative embodiments, it is not to be restricted by the embodiment but only by the appended claims. It is to be appreciated that those skilled in the art can change or modify the embodiment without departing from the scope and spirit of the present invention.

What is claimed is:

1. A food cutting apparatus comprising:
    first and second guide panels positioned to stand vertically and spaced apart from each other at a preset distance, each of the first and second guide panels having a plurality of cutting slots formed downwardly at regular interval, with each pair of corresponding cutting slots of the first and second guide panels defining a cutting guide path to guide a cutting knife there-through to cut food products placed between the guide panels into pieces;
    a cutting board placed between the first and second guide panels, the cutting board having a predetermined width configured to preset the spaced distance of the first and second guide panels corresponding to the predetermined width by abutting the first and second guide panels against two opposing side faces of the cutting board placed there-between, thereby, enabling the user to slice the placed food products into multiple pieces using a cutting knife introduced to the plural pairs of corresponding cutting slots of the first and second guide panels;

first and second guide posts coupled perpendicularly to the first and second guide panels so as to guide and position the first and second guide panels spaced at the preset distance there-between; and a second cutting board having another predetermined width, which is different from the predetermined width of the first cutting board, configured to preset the spaced distance of the first and second guide panels to a different distance by abutting the first and second guide panels against two opposing side faces of the second cutting board placed there-between, thereby, enabling the user to place and slice different amount of the food products into multiple pieces.

2. The food cutting apparatus according to claim 1, wherein the guide panels are formed of metal.

3. The food cutting apparatus according to claim 1, wherein the guide panels are formed of polymer, plastic, or composite material, and include a metal liner covering the cutting slots to protect them from wearing and deteriorating their shapes.

4. The food cutting apparatus according to claim 1, further comprises guiding bushings affixed at lateral sides of the guide panels, each of the guide bushings having a through hole through which a shaft portion of the guide posts are introduced to slide and allow a precise guiding of the guide panels.

5. The food cutting apparatus according to claim 1, further comprising a specialized cutting knife, wherein the specialized cutting knife comprises a plurality of cutting blades arranged in a regular interval, in the same interval as the interval of the cutting slots of the guide panels.

6. The food cutting apparatus according to claim 5, wherein the specialized cutting knife includes a plurality of guide shafts affixed to the cutting blades.

7. The food cutting apparatus according to claim 6, wherein the specialized cutting knife includes fixation bushings affixed to the cutting blades to guide and fix the guide shafts.

8. The food cutting apparatus according to claim 6, wherein the specialized cutting knife further includes a spacer placed on the guide shafts between the cutting blades to preset the distance between the cutting blades.

9. The food cutting apparatus according to claim 6, wherein the distance between the cutting blades is adjustable.

10. A food cutting apparatus comprising:
first and second guide panels positioned to stand vertically and spaced apart from each other at a preset distance, each of the first and second guide panels having a plurality of cutting slots formed downwardly at regular interval, with each pair of corresponding cutting slots of the first and second guide panels defining a cutting guide path to guide a cutting knife there-through to cut food products placed between the guide panels into pieces;

a cutting board placed between the first and second guide panels, the cutting board having a predetermined width configured to preset the spaced distance of the first and second guide panels corresponding to the predetermined width by abutting the first and second guide panels against two opposing side faces of the cutting board placed there-between, thereby, enabling the user to slice the placed food products into multiple pieces using a cutting knife introduced to the plural pairs of corresponding cutting slots of the first and second guide panels;

first and second guide posts coupled perpendicularly to the first and second guide panels so as to guide and position the first and second guide panels spaced at the preset distance there-between;

guiding bushings affixed at lateral sides of the guide panels, each of the guide bushings having a through hole through which a shaft portion of the guide posts are introduced to slide and allow a precise guiding of the guide panels; and a sliding movement locking element installed on the shaft portion of the guide posts at a location on a backside of the second guide panel in order to stop a backward sliding movement of the second guide panel during a food cutting process.

11. The food cutting apparatus according to claim 10, wherein the sliding movement locking element includes a fly nut or wing nut.

12. The food cutting apparatus according to claim 10, further comprising a second cutting board having another predetermined width, which is different from the predetermined width of the first cutting board, configured to preset the spaced distance of the first and second guide panels to a different distance by abutting the first and second guide panels against two opposing side faces of the second cutting board placed there-between, thereby, enabling the user to place and slice different amount of the food products into multiple pieces.

13. The food cutting apparatus according to claim 10, further comprising a specialized cutting knife, wherein the specialized cutting knife comprises a plurality of cutting blades arranged in a regular interval, in the same interval as the interval of the cutting slots of the guide panels.

14. The food cutting apparatus according to claim 10, wherein the specialized cutting knife includes a plurality of guide shafts affixed to the cutting blades.

15. The food cutting apparatus according to claim 14, wherein the specialized cutting knife includes fixation bushings affixed to the cutting blades to guide and fix the guide shafts.

* * * * *